(No Model.)
E. C. LEFFERTS.
Vehicle Spring.
No. 229,261.        Patented June 29, 1880.
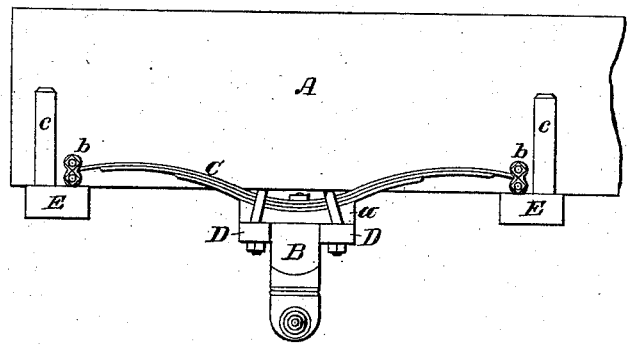
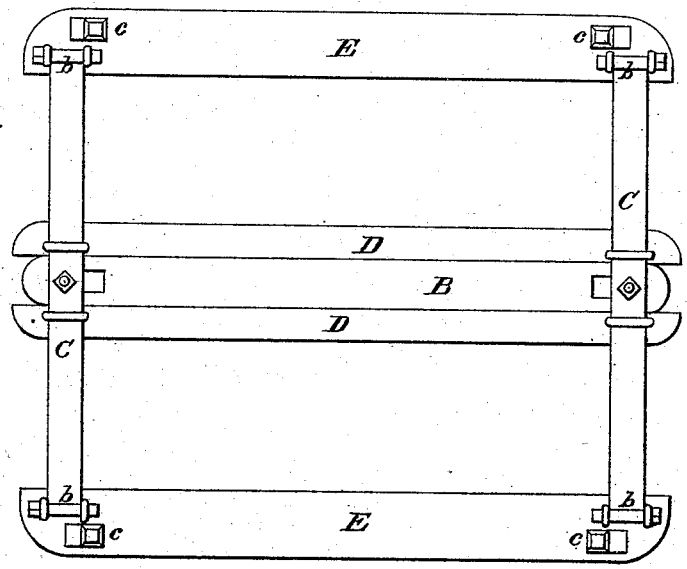
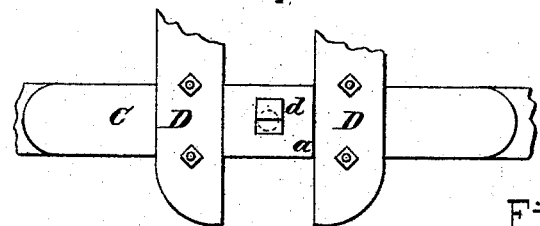
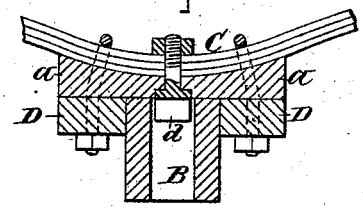
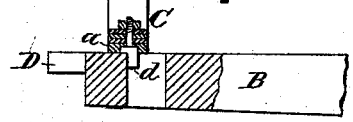
ATTEST:
Julian A. Hurdle,
S. A. Brown.
INVENTOR:
Ebenezer C. Lefferts
By his Attys.
Burke, Fraser & Cornett

UNITED STATES PATENT OFFICE.

EBENEZER C. LEFFERTS, OF HUNTINGTON, NEW YORK.

VEHICLE-SPRING.

SPECIFICATION forming part of Letters Patent No. 229,261, dated June 29, 1880.

Application filed May 15, 1880. (No model.)

*To all whom it may concern:*

Be it known that I, EBENEZER C. LEFFERTS, a citizen of the United States, residing at Huntington, in the county of Suffolk and State of New York, have invented certain Improvements in Springs for Vehicles, of which the following is a specification.

This invention relates to springs for convertible vehicles, or those which may be changed from spring to dead-bed vehicles, or vice versa, at pleasure; and it consists in the peculiar construction and combination of parts whereby the standards at the sides of the bed or body move with it and the springs are not clamped beneath the bed and bolster or axle when the vehicle is heavily loaded.

I am fully aware that vehicles with removable springs to render them convertible have been employed; but so far as I am aware the springs in these have all been arranged under the body or bed and between it and the bolster. In this construction, when the load is heavy the bed cannot settle down upon the bolster or axle, as it should, but rests upon the flattened springs, which is deemed objectionable.

Moreover, in all vehicles of this kind with which I am acquainted the standards are fixed in the bolster, and the play of the bed up and down between them causes friction and wear, which is also thought to be objectionable.

My invention, which I will now describe, seeks to obviate these defects.

In the drawings, Figure 1 is a side view of the spring and the vehicle-bed. Fig. 2 is a plan of the spring with the bed removed. Fig. 3 shows the under side of the spring enlarged, and Fig. 4 is a section of Fig. 3. The latter view shows the bolster in section also. Fig. 5 is a detached sectional view on the same scale as Fig. 1.

These views are intended to illustrate my preferred method of attaching the spring to the bolster or axle.

Let A represent the bed of a wagon, and B the bolster.

It will be understood that the bolster is not provided on the hind axle, and the spring will rest directly upon said axle.

In the drawings only the axle for the fore wheels is shown.

C C are laminated springs, arranged in pairs, four being required for the vehicle. These are firmly secured to tie-bars D D, which are adapted to embrace the bolster or axle when the springs are in place, blocks or bed-pieces $a$ $a$ being provided to form seats for the springs. The springs are separated far enough to admit the bed between them.

E E are supports for the bed. These are connected to the springs by links $b$ $b$, and are provided with suitable standards $c$ $c$ to keep the bed in place.

The ordinary standards in the bolster and hind axle are made removable, and when a dead-bed wagon is to be converted into a spring-wagon these are taken out of their sockets. The springs are then set upon the bolster and axle, as indicated in the drawings, the ties D D embracing the same. The bed is then set upon the supports E E between the standards $c$ $c$.

To prevent the springs from slipping on the bolster and axle, I provide projections $d$ $d$ on the bed-pieces, arranged to take into the holes or sockets in the said bolster and axle, from which the standards have been removed.

Other equivalent means for preventing the movement of the springs on the bolster and axle may be substituted for this—as, for instance, gains or recesses may be cut in the bolster and axle to receive the bed-pieces $a$ $a$.

It will be seen that my springs are arranged outside of the bed, and consequently when the vehicle is very heavily loaded the bed may sink down and rest upon the bolster.

The supports E E take under the bed at four different points, and the weight is thus distributed equally.

Having thus described my invention, I claim—

1. A removable vehicle-spring composed of the following elements—namely: the two springs C C, the bed-pieces $a$ $a$, the tie-bars D D, and the supports E E, provided with suitable standards, all arranged substantially as and for the purposes set forth.

2. The combination of the bolster B, provided with removable standards, the springs C C, the tie-bars D D, arranged to embrace the bolster, the bed-pieces $a$ $a$, provided with projections $d$ $d$, to engage the sockets in the bolster, and the supports E E for the bed, all arranged substantially as shown.

In witness whereof I have hereunto signed my name in the presence of two subscribing witnesses.

EBENEZER C. LEFFERTS.

Witnesses:
 HEWLETT J. LONG,
 JOHN R. BEATTY.